United States Patent [19]

Takahashi et al.

[11] Patent Number: 4,989,258
[45] Date of Patent: Jan. 29, 1991

[54] CHARACTER RECOGNITION APPARATUS

[75] Inventors: Hiroyasu Takahashi, Yokohama; Akio Yamashita, Musashino, both of Japan

[73] Assignee: International Business Machines Corporation, Armonk, N.Y.

[21] Appl. No.: 239,110

[22] Filed: Aug. 31, 1988

[30] Foreign Application Priority Data

Sep. 9, 1987 [JP] Japan ................. 62-224233

[51] Int. Cl.$^5$ .............................. G06K 9/68
[52] U.S. Cl. ....................... 382/37; 382/18; 382/22; 382/25; 382/38
[58] Field of Search ............ 382/37, 38, 36, 16, 382/18, 22, 25, 56, 48; 358/261.1

[56] References Cited

U.S. PATENT DOCUMENTS

| | | | |
|---|---|---|---|
| 3,346,845 | 10/1967 | Fomerho | 382/18 |
| 3,755,780 | 8/1973 | Sammon et al. | 382/37 |
| 3,858,180 | 12/1974 | Spanjessberg | 382/18 |
| 4,193,056 | 11/1980 | Morita et al. | 382/25 |
| 4,521,904 | 6/1985 | Wang | 382/38 |
| 4,589,142 | 5/1986 | Bednar | 382/37 |
| 4,658,429 | 4/1987 | Orita et al. | 382/36 |

FOREIGN PATENT DOCUMENTS

| | | |
|---|---|---|
| 56-35276 | 4/1981 | Japan . |
| 57-212589 | 6/1981 | Japan . |
| 60-61876 | 4/1985 | Japan . |
| 61-75486 | 4/1986 | Japan . |
| 61-173387 | 8/1986 | Japan . |

OTHER PUBLICATIONS

Casey & Jik, A Processor-based OCR System, IBM Journal of Research and Development, vol. 27, No. 4, Jul., 1983, pp. 386-399.

Casey & Nagy, Decision Tree Design Using Probabilistic Model, IEEE Transactions On Information Theory, vol. IT-30, No. 1, Jan. 1984 pp. 93-99.

Primary Examiner—David K. Moore
Assistant Examiner—Joseph Mancoso
Attorney, Agent, or Firm—David J. Arthur; G. Marlin Knight

[57] ABSTRACT

This invention enables easy and fast selection of candidates for an inputted character image among the character categories by search of a tree-structured dictionary. Each ordinary node of the tree structure has three branches, that is two ordinary nodes and one reject node, and compares the multivalued feature extracted from the inputted character image for the node concerned, with a threshold, upper limit and lower limit values. If the feature value is out of the limited range, the search goes down to the reject node at the next level. If not, the search goes down to the right or left node at the next level based on the comparison of the feature value with the threshold value. Reject nodes have no branch. The tree structure has character category information as leaves connected to the bottom ordinary nodes and another character category information for all the reject nodes. Search of the dictionary gives character category information indicating the candidates, which are thereafter tested by detailed matching for outputting recognition results. In particular, this invention can use white pel run length as multivalued features. The white pel run length is defined as the run length of white pels from a point on an edge of the segmentation window to the nearest black pel or edge in a direction. It is easy to construct and optimize the dictionary, since many varieties of white run length are generated from little sampling data.

14 Claims, 4 Drawing Sheets

CHARACTER RECOGNITION APPARATUS

BACKGROUND OF THE INVENTION

A. Field of the Invention

This invention relates to a character recognition apparatus, and more particularly to one that is arranged to recognize characters, particularly printed alphanumeric characters, even when it is realized on a general-purpose personal computer, without using special hardware.

B. Prior Art

Recognition of alphanumeric characters has reached the stage of practical use, and several products are available in the market. However, most of them are dedicated machines that require special hardware and are expensive. These systems are mainly used for special applications in which large numbers of documents are continuously read.

Applications with office automation equipment incorporated with an OCR device will be widely used in the future, which easily read and edit typed or printed alphanumeric documents and then store them on a disk or the like. For such applications, a compact, inexpensive OCR for printed alphanumeric characters is essential.

Typical conventional techniques for printed alphanumeric characters are a pattern matching technique where a feature value is extracted from a binary coded character pattern and the character is then selected as the first candidate whose reference pattern in the recognition dictionary has the nearest feature vector to one of the inputted character; and a technique for determining a candidate character by using a so-called binary tree dictionary with point sampling. The former is easy in regards to the creation of the recognition dictionary and adaptation, but has a disadvantage in that it has a slower recognition speed because it generally uses a complicated feature value and processing procedure to improve the recognition rate. The latter requires a vast amount of statistics and time for creation, and addition and modification to the dictionary is difficult. Therefore, in the conventional approach, it is difficult to attain sufficient processing speed, an easy-to-use dictionary creation feature, and an addition and modification feature on a general-purpose personal computer. For detail of the above-mentioned technique using a binary tree dictionary with point sampling, refer to, for example, "A Processor-based OCR System" by R. G. Casey and C. R. Jik, IBM Journal of Research and Development, Vol. 27, No. 4, July, 1983, pp. 386–399, or "Decision Tree Design Using Probabilistic Model" by R. G. Casey and G. Magy, IEEE Transaction on Information Theory, Vol. IT-30, No. 1, January, 1984, pp. 93–99.

Prior art relevant to the invention includes Japanese Published Unexamined Patent Applications, PUPA Nos. 60-61876, 61-75486, and 61-173387. In these specifications, a decision tree for recognizing a character or pattern is formed by sequentially performing classification based on multi-value feature, and the candidates are narrowed down by using this tree. However, this technique never describes the use of a reject node.

Other related prior art is as follows.

JPUPA Nos. 57-212589 and 56-35276 disclose registering rejected character patterns and improving recognition thereafter. JPUPA No. 58-201184 discloses classifying character patterns by using distance from a predetermined position on the character frame to a position in the character pattern or on the frame in a predetermined direction.

OBJECTS OF THE INVENTION

In consideration of the above circumstances, the object of the present invention is to provide a character recognition apparatus where a recognition dictionary with high reliability can be created in a short period of time without the creation of the recognition dictionary complicated, and where characters can be recognized at a high speed and with a high correct answer rate.

SUMMARY OF THE INVENTION

In order to accomplish the above object, according to the present invention, a tree structure dictionary is searched by using multi-value feature value extracted from an unknown inputted character pattern. Then, an upper or lower limit value is assigned on at least one branch of the tree structure dictionary, and the search of the tree structure dictionary is discontinued when the multi-value feature extracted from an unknown inputted character patterns for a certain branch exceeds the upper or lower limit. Thus, unnecessary search for the dictionary is avoided.

In a particular embodiment, a binary coded character pattern is segmented and normalized in the character buffer, and distances between the four sides of an imaginary character frame and the character pattern or an opposite side (hereinafter called "white run length") are determined. These distances are used as feature values. Further, a suitable range is provided for each white run length of each character categories to provide redundancy that adapts for positional variation and variation of samples. Character categories are classified into two classes based on whether or not the white run length for each character category at the same position exceeds a threshold value. Some categories may belong to both classes. In classifying, the position and threshold value of the white run length are determined to provide the separation between two classes with the maximum. A tree structure dictionary is created by repeating a similar operation for each classified class. At each terminal node of the tree structure dictionary, one or more character categories are registered. The reference pattern of each character category registered at the selected terminal node is matched against the inputted pattern, the likelihood therebetween is determined, and then the character categories are ordered based on the likelihood.

According to this configuration, it is possible to create a tree structure recognition dictionary with high reliability from a small number of samples in a short period of time, and to attain a high recognizing speed without sacrificing the recognition rate.

Further, according to this configuration which combines the narrowing down of candidates by a tree structure dictionary and the final recognition by pattern matching, the addition and modification of character categories of the dictionary through training which are generally weak points of the tree structure dictionary, can be performed with a simple procedure of addition of registered character categories into the terminal nodes or the like.

DETAILED DESCRIPTION OF THE PREFERRED EMBODIMENTS

Now, the invention is described with an embodiment applied to a document input system with a printed alphanumeric OCR.

Figure 2:
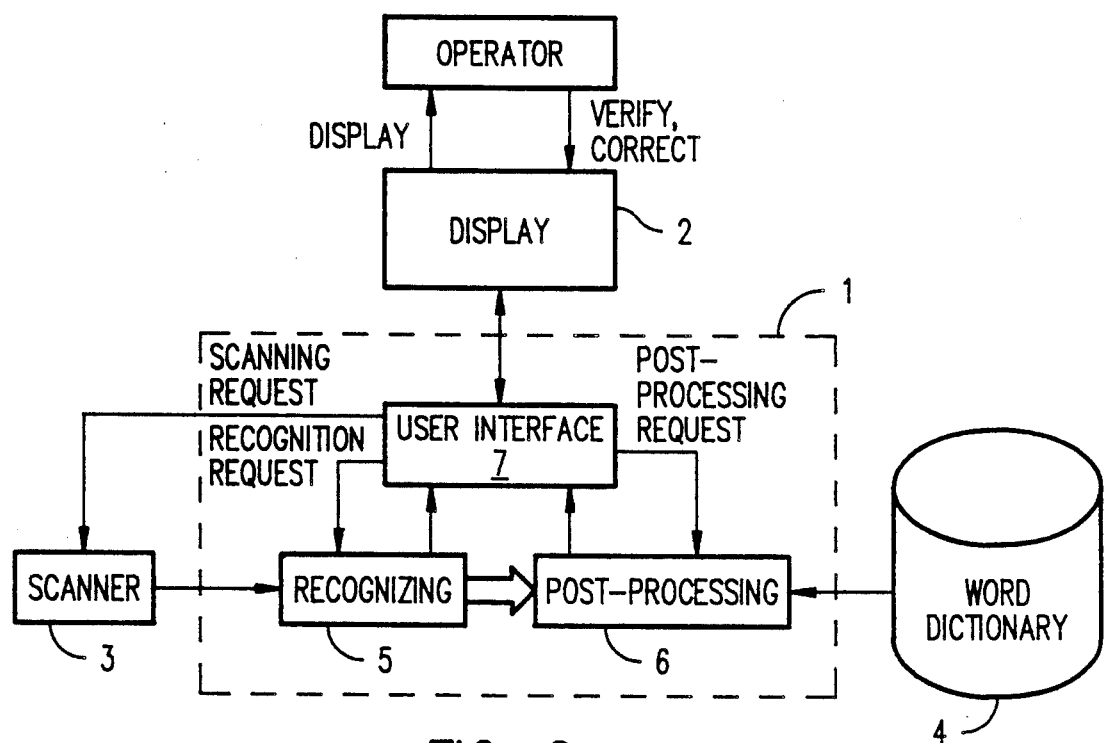
FIG. 2 is a block diagram illustrating the embodiment as a whole.

FIG. 2 shows an entire configuration of the embodiment, in which the system consists of a personal computer 1, a bit map display 2, a scanner 3 and an auxiliary storage 4. A block enclosed in the broken line, which includes a recognizing section 5, a post-processing section 6, and a user interface 7, is implemented in software.

Figure 3:
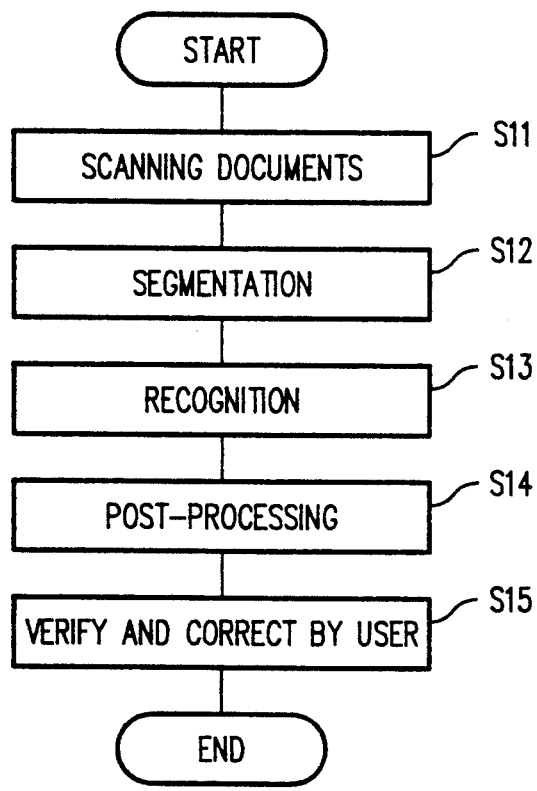
FIG. 3 is a flowchart illustrating the procedure of the embodiment.

FIG. 3 shows the procedure of the system shown in FIG. 2. In FIGS. 2 and 3, when an operator issues a process start command, the user interface 7 first supplies a scan request to the scanner 3. A document is scanned by the scanner 3, and the image of it is supplied to the recognizing section 5 (S11). The recognizing section 5 segments the image for each character (S12) and then recognizes which character category the image segmented for each character is (S13). In step S12, the segmented character is stored, for example, with the center of the character being in alignment with the center of the region of 32 × 32 pels. Step S13 is a section to which the invention is directly related, and is described in detail later. The result of the recognition is not necessarily determined to be unique, but several candidates may be outputted. When recognition is completed for one word, the user interface 7 requests the post-processing section 6 to verify and correct misspelling in the recognition result.

The post-processing section 6 executes the verification of spelling of the recognition result supplied from the recognizing section 5 by referring to the word dictionary in the auxiliary storage 4, and retrieves an approximately matched word if there is no applicable word in the dictionary (S14). The result of step S14 is displayed on the display 2 through the user interface 7, and the operator performs final recognition and correction (S15). Thus, a coded, correct document is obtained.

Now, the recognizing section 5 is described in detail. The operation of the recognizing section 5 is roughly divided into two steps. In the first step, candidate character categories are narrowed down to one or several character categories by recognition technique with a tree structure recognition dictionary wherein the lengths of lines drawn from the four sides of a character area to the edge of the character or to the opposite side of the area (white run length) are used as feature values, and wherein candidate character categories are narrowed down by branching to the right or left depending whether or not the white run length exceeds a threshold value.

In addition to the threshold value for causing a branch to right or left, each node is defined with maximum and minimum values that the white run length can take. When these values are exceeded, a fault condition is determined to exist, and the recognition processing is discontinued.

In the second step, the reference patterns of the candidate character categories are matched against the inputted pattern, and then the character category having the shortest distance is determined as the first candidate.

Now, more detailed description is given on the creation of a tree structure recognition dictionary, pattern matching, overall process of recognition, and technique for adding and modifying the recognition dictionary.

Creation of the tree structure recognition dictionary

Figure 4:
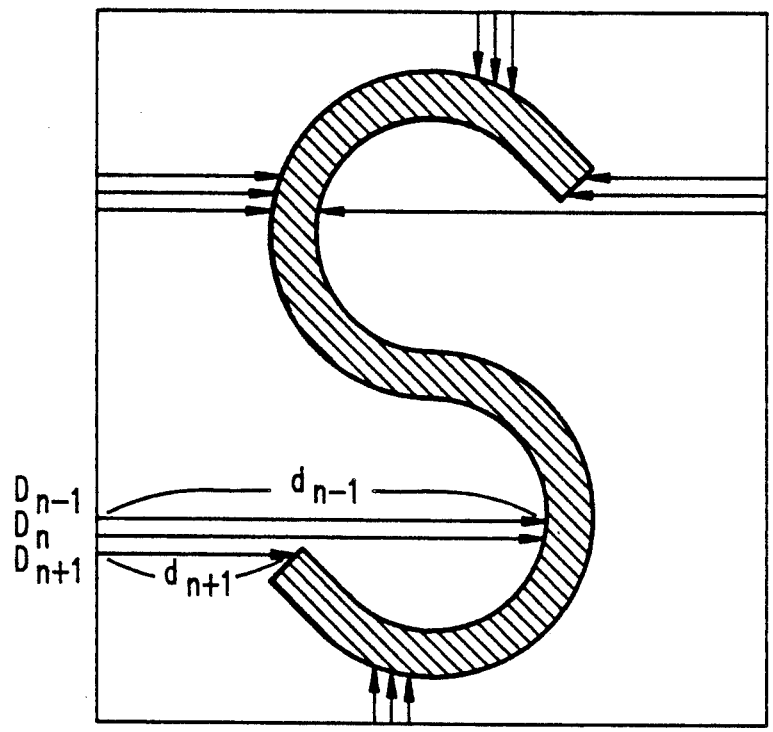
FIG. 4 is a diagram illustrating white run length, which is a feature value used in searching the tree structure dictionary of the embodiment.

Referring to FIG. 4, distances from the four sides of an imaginary character frame to the opposite sides or to the character (white run length) are determined for a binary coded character pattern normalized in a character area. The number i of white run lengths Di per character pattern varies according to the size of the character area in which they are stored. Generally, if they are stored in a character area with dimensions of (X pels)×(Y pels), the number of white run lengths is $2 \times (X+Y)$.

Now, one white run with a length of Dn is considered. Let dn be an example value of Dn. dn varies according not only to variation in character samples, but also to variation of the position in the character area, at which the character sample is stored after segmentation and normalization. Thus, dn is a multi-value feature with minimum and maximum values. The method for determining the minimum and the maximum values will be explained with reference to FIG. 4.

Referring to FIG. 4, Dn of one character category, and Dn−1 and Dn+1 at each side of Dn are considered. Because multiple samples are prepared for the same character category for absorbing variation in samples, the maximum value dnmax and the minimum value dnmin are determined for white run lengths of 3×(number of samples) in total, and are selected as the maximum and the minimum values of Dn.

On that occasion, the value of white run length Dn is increased by one pel in finding the maximum value, and decreased by one pel in finding the minimum value. That is, $$dn\text{max} = \max[(d_{n-1}, d_n+1, d_{n+1}) \times \text{number of samples}] \quad (1)$$

$$dn\text{min} = \min[(d_{n-1}, d_n-1, d_{n+1}) \times \text{number of samples}] \quad (2)$$

In actual recognition, a variation in the thickness or blur of a character, or positional error in normalizing in the character area may arise. However, shifting in the vertical (or horizontal) direction is absorbed by using the white run lengths at each side of Dn, and shifting in the horizontal (or vertical) direction is also absorbed by increasing or decreasing the white run length of Dn.

Experiments assured that the above technique is suitable as a method for adding redundancy to the white run length. However, if the size of characters or the resolution of the scanner are significantly different, it is necessary to add more redundancy or reduce it.

Figure 5:
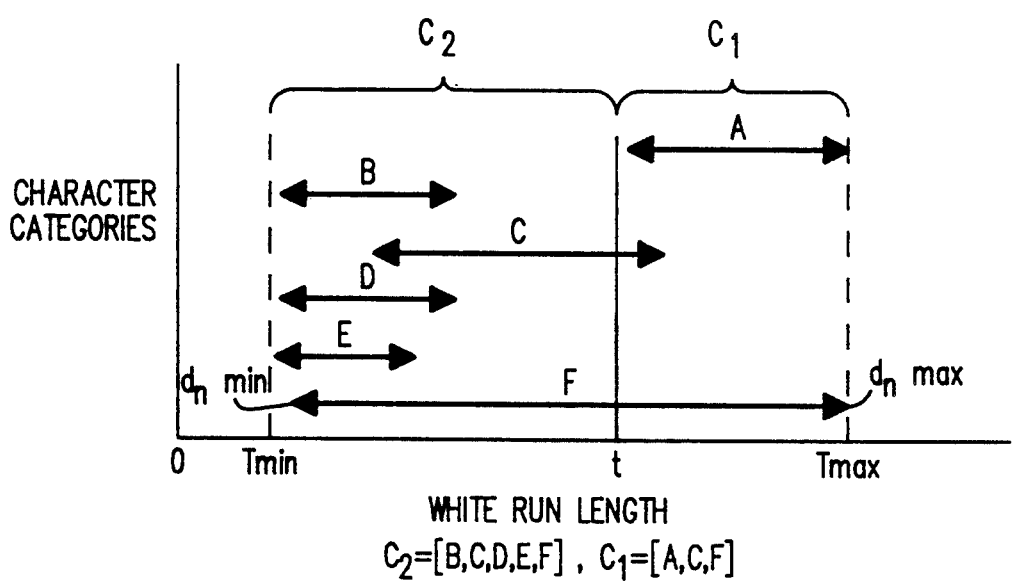
FIG. 5 is a diagram illustrating classification operation in creating the tree structure dictionary of the embodiment.

Distribution of values dn of the white run lengths of various character categories for Dn at the same position in the character area is, for example, shown in FIG. 5. Now, by tentatively setting a threshold value t at the position shown in the figure, all character categories are classified into two classes depending upon whether or not the white run length at the concerned position of each character category exceeds threshold value t. Because the white run length is a multi-value feature rather than binary, the classification is performed according to the following definition:

Class $C_1 = \{ci \; dn\max > t\}$ (3)

Class $C_2 = \{ci \; dn\min < t\}$ (4)

ci: character category

As the above, in a case where the white run length is clearly smaller or larger than t, it is classified into classes $C_1$ or $C_2$, respectively. The character category that has a white run length that crosses over the threshold line t is classified into both of the classes $C_1$ and $C_2$.

Then, degree of separation between classified classes $C_1$ and $C_2$ is defined, and a combination of the position and the threshold value of the white run length which provides the maximum degree of separation is determined. Various types of separation degrees may be used, such as from one that is statistically strict to one that is simplified for reducing the processing. For example, a product of the numbers of elements in respective classes is used as the degree, and defined as follows;

$V = Ac1 \times Ac2$ (5)

V: degree of separation
Ac1: number of elements in class $C_1$
Ac2: number of elements in class $C_2$
(excluding duplicated character categories)

If too much duplication makes the separation between the classes worse, V also becomes smaller. V becomes larger if the numbers of non-duplicated character categories in $C_1$ and $C_2$ are substantially equal. In creating the tree structure recognition dictionary, it is desirable to not only improve the degree of separation between classes $C_1$ and $C_2$, but to also ensure that separated classes $C_1$ and $C_2$ are balanced. Other techniques are reported to create an exact balanced tree. Results of experiments assured that a well balanced dictionary can be created in a short period of time by using the degree of separation of equation (5).

Figure 6:
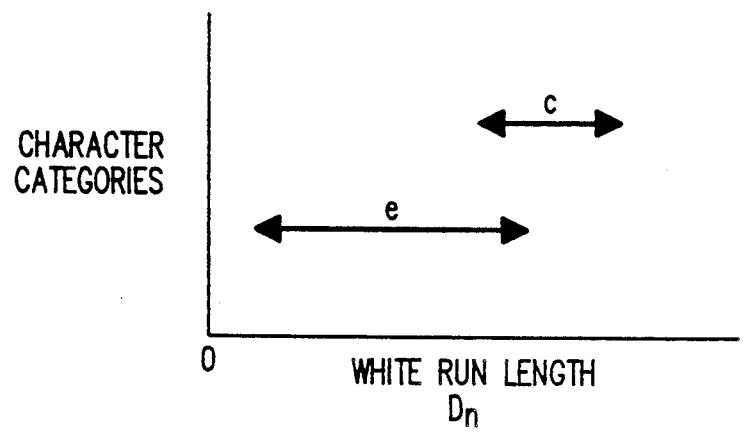
FIG. 6 is a diagram illustrating how character categories are finally classified.
Figure 7:
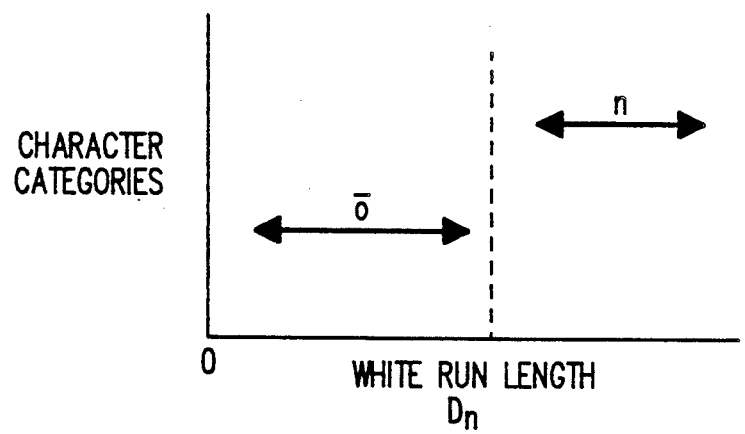
FIG. 7 is a diagram illustrating how character categories are finally classified.

As described above, the optimum position and threshold value of the white run length are determined for efficiently dividing all character categories into two classes, including duplicate, and the two classes are then selected as the successors of the root node. Then, similar operation is performed on each of the classes to reclassify them such as $C_1 \rightarrow \{C_{11}, C_{12}\}$ and $C_2 \rightarrow \{C_{21}, C_{22}\}$. Nodes and their successors are sequentially determined to create a tree structured recognition dictionary by repeating this process. For each node a subset of character categories and a combination of the position and the threshold value of the white run length, which optimally divides the subset into two. Finally, the creation of the recognition dictionary terminates at a state either where, as shown in FIG. 6, the class cannot be divided into two any more for any white run length, or where, as shown in FIG. 7, the classes are finely separated from each other for character categories.

Referring to FIG. 5 showing the threshold value of the white run length determined for a node by the above process, and the distribution of the values of the white run length for character categories, the minimum white run length value Tmin and the maximum white run length value Tmax are determined for dmin and dmax of all the character categories included in the class shown in the figure. There may be erroneous branching for an inputted character pattern in recognition, which is different from ones used in creating the dictionary. There may be consequently a case where a character category, which should not reach a node, is branched to that node. Then, the recognition dictionary is structured in, not a binary tree, but a ternary tree having the third successor, where if a white run length value exceeds the maximum or falls short of the minimum value defined for each node, branch is made to this reject node in order to discontinue the processing. Thus, each node has, as information for branching the inputted character category, the maximum and the minimum values that the white run length can take, in addition to the position and the threshold value of the white run length.

In actually determining Tmin and Tmax, it is desirable to provide redundancy to prevent the increase of cases in which reject is caused because of erroneous branching. That is:

$T\min = \min[\text{minimum white run length value of each character category at a node}] - \alpha$ (6)

$T\max = \max[\text{maximum white run length value of each character category at a node}] + \alpha$ (7)

Figure 1:
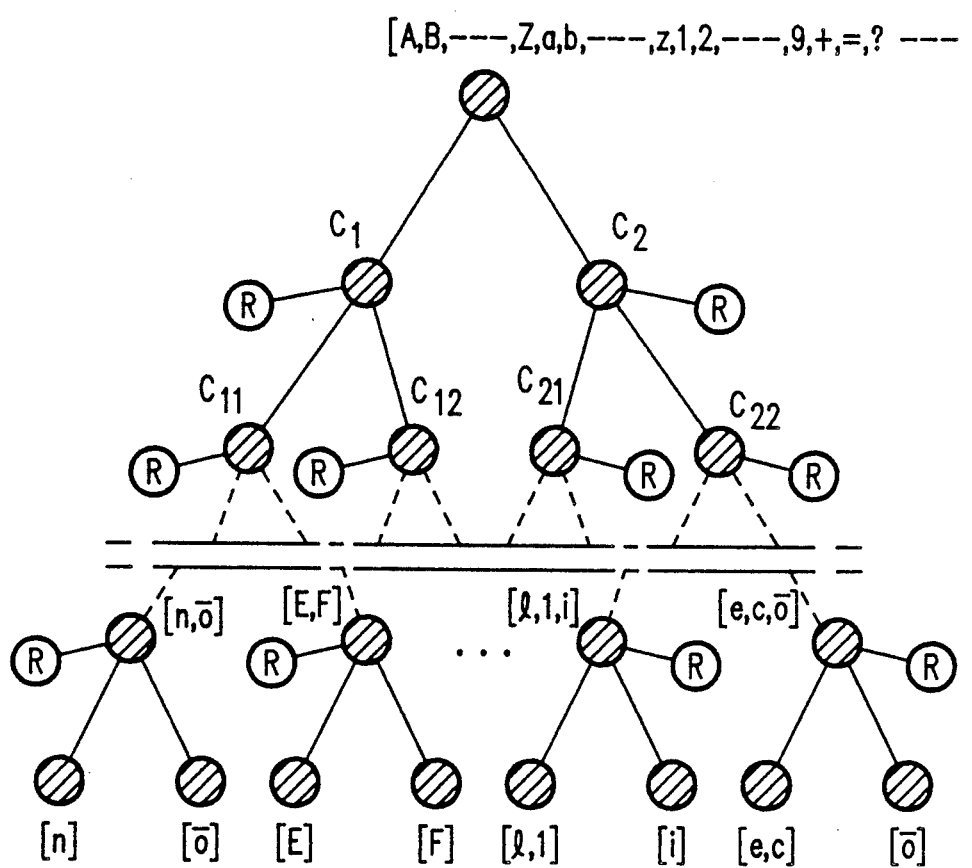
FIG. 1 is a diagram illustrating a tree structure dictionary of an embodiment according to the present invention.

FIG. 1 shows an entire recognition dictionary. At an terminal node one or more character categories are registered. Because duplication is allowed in separating the character categories, certain character categories may be duplicated in different terminal nodes.

In FIG. 1, circles with diagonal shading indicate normal nodes, while those with R indicate reject nodes.

Pattern matching

In the recognition process using the tree structure recognition dictionary, more than one character category may be determined as final character candidates. In such a case, the feature value is extracted from the inputted pattern in respect with the feature vector, and the inputted pattern and the reference pattern of each candidate character category which is included in the selected terminal node are matched, and the candidate character categories are ordered according to the matching distances, such as the first candidate, the second candidate, and the like.

Various pattern matching techniques have been reported. Any technique can be employed herein. However, the most desirable one is one which is simple to process and which will not deteriorate the recognition speed. For example, a possible technique is one that divides a character pattern storing area into $m \times n$ portions in mesh, employs as a feature value a vector of $m \times n$ dimensions, each element of which is the number of black pels in each portion, and selects as the top candidate the character category having the maximum simple likelihood of the feature value vector of the reference pattern with the feature value vector of the inputted pattern. This simple likelihood is defined as follows:

$$R = I \cdot S / ||I|| \, ||S|| \qquad (8)$$

R: likelihood
I: inputted pattern vector
S: reference pattern vector
I·S: inner product A conventional recognition technique using a tree structure recognition dictionary generally has shortcomings in that ordered multiple candidates cannot be determined, or that there is no measurement for how much likelihood the inputted pattern has with the top candidate. Such shortcomings can be complemented by combining with the pattern matching technique shown in this example. This is also easily utilized for post-processing such a spell checking.

Overall process for recognition

Now, the recognition process with the tree structured dictionary and the way in which it is combined with the patter matching will be described.

First, all of unknown inputted binary coded character patterns are branched at the root of the tree structure dictionary to the left or the right branch depending on whether or not the value of white run length at a particular position exceeds a predetermined threshold value. Sequentially, it is further branched at the branched node according to the value of white run length at a given position, and goes to a successor node. At this moment, if the white run length value exceeds the minimum or falls short of the maximum white value for the white run length, it is rejected. In this manner, the candidate character categories are narrowed down by sequentially repeating the branching, and the processing goes to pattern matching when the terminal node is reached.

Since the candidate character categories are narrowed down to one or several categories at the terminal node, it is necessary only to perform matching with the reference patterns of the narrowed-down character categories. According to experiments, the number of character categories registered at the terminal node is five to six categories at the maximum, and two to three types on the average with a tree structure dictionary composed of 81 character categories. Even if the character candidates are narrowed down to one in the recognition technique using a tree structure dictionary, the matching with the pattern matching technique is performed to assure that there is no error caused by incorrect branching. The character category is selected as the top candidate when it has the shortest distance in the pattern matching, and the distance does not exceed the threshold value determined for the distance scale. If there are multiple candidate character categories at the terminal node, they are put in order according to the distance values.

Addition and modification of recognition dictionary

When new character categories are registered, or where it is intended to relieve erroneous recognition caused by the difference between sample character patterns used in creating the recognition dictionary and the actual inputted character patterns, addition or modification of the recognition dictionary by adaptation using the inputted character patterns is required. The addition or modification of the tree structure dictionary is conventionally performed by extension of the decision tree. That is, new branches from terminal or intermediate nodes are provided in order to register new character types or to modify the dictionary. This technique requires a troublesome procedure similar to that used in creating the dictionary, and the size of the tree structure dictionary is significantly increased when addition or modification is repeated.

In this embodiment, the addition or modification of the tree structure dictionary is performed by the addition of character categories registered at the terminal nodes. That is, in a case where an inputted character pattern reaches a terminal node where that character category is not registered, as the result of erroneous branching, the character category is newly registered in a registered character group for pattern matching. This achieves the same effect as the expansion of a tree structure dictionary by making new branches at the terminal nodes, with very easy operations. In addition, although the prior technique creates a recognition tree from multiple samples for taking statistic variation into account, information of at most one sample is usually used for making new branches, so that the added portion of the recognition tree provides unavoidably low reliability. With the technique according to the present invention, the reliability is never deteriorated, because the recognition tree itself is not modified but only character categories to be checked in the following pattern matching are added.

To be exact, the method for addition or modification of the recognition dictionary in adaptation using the inputted pattern is separately applied to the following three cases.

Case (1)

A case where the character categories registered at the terminal node to which an inputted character pattern reaches in an actual recognition process do not contain one that corresponds to the inputted character category.

In this case, the inputted character category is newly added to the character category group at the terminal node. In case where the inputted character category is of a completely new category that was not encountered in creating the recognition dictionary, it is added not only to the tree structure dictionary, but also to the recognition dictionary for the pattern matching.

Case (2)

A case where an inputted character category is erroneously recognized because of poor results of the pattern matching, although the character category group registered at the node contains one that corresponds to the inputted character category.

In this case, modification is made to the recognition dictionary for the pattern matching. For example, smoothing of a template may be employed.

Case (3)

A case where a character pattern is branched to a reject node on the way of the tree structure dictionary search.

In this case, a new terminal node is provided for the rejected character patterns, and at this terminal node the rejected character patterns are matched against the reference patterns. Adaptation is performed by newly adding and registering the inputted character categories to the terminal node for rejection.

According to the present invention a recognition dictionary of a tree structure is created by using multi-value feature with maximum and minimum values such as a white run length, rather than a binary feature value such as black or white pels, so that the dictionary can be created through very simple operations with fewer samples. In addition, recognition error due to erroneous branching can be detected at the time of searching of the dictionary tree by using a ternary tree instead of a binary tree, to improve the efficiency in the recognition.

Furthermore, combination of the recognition technique with the tree structure dictionary and the pattern matching technique provides a feature that the former can efficiently narrow down the candidate character categories, and then the latter can order the candidates.

Thus, because high speed and high recognition ratio can be realized, and the processing is simple, a substantially practical system can be implemented on a general purpose personal computer in software only, without using special hardware.

In addition, it is easy to improve the recognition ratio through adaptation because addition or modification of the recognition dictionary can be very easily performed.

What is claimed is:

1. A character recognition apparatus wherein one or more character category candidates for an unknown character pattern are automatically determined through a search in a dictionary depending on multivalued features extracted from said pattern, comprising:
    a tree-structured dictionary further comprising:
        nonterminal nodes, each having an assigned multivalued feature and a corresponding threshold value, at least one of said nonterminal nodes having a corresponding limit value;
        character category terminal nodes corresponding to at least one character category; and
        at least one reject terminal node which causes termination of said search; and
    means, at each nonterminal node responsive to the value of the assigned multivalued feature extracted from said unknown character pattern and corresponding limit and threshold values, for branching to the corresponding successor node, so that the branch will be made to the successor reject node if a limit value has been assigned to the nonterminal node and the value of the assigned multivalued feature is outside of the limit, and otherwise the branch will be made to the successor node based on the comparison of the value and the threshold value.

2. The character recognition apparatus of claim 1 wherein said multivalued features include a distance from a predetermined position on a character frame to a position on a character pattern in a predetermined direction.

3. The character recognition apparatus of claim 1 wherein said means for branching causes the branch to the successor reject node to be taken when said value of the assigned multivalued feature extracted from said unknown character pattern exceeds said limit value.

4. The character recognition apparatus of claim 3 wherein said means for branching causes a branch to one of two successor nodes when the value of the assigned multivalued feature exceeds said threshold value.

5. The character recognition apparatus of claim 4 wherein said multivalued features include a distance from a predetermined position on a character frame to a position on a character pattern in a predetermined direction.

6. The character recognition apparatus of claim 1, additionally comprising means for pattern matching said unknown character pattern with reference patterns for each character category within the selected character categories corresponding to the character category terminal node resulting from the search of the tree-structured dictionary.

7. The character recognition apparatus of claim 6, wherein the means for pattern matching additionally comprise ranking means for determining which of said reference patterns matches closest to said unknown character pattern.

8. A character recognition apparatus wherein a subset of character category candidates for an unknown character pattern are automatically determined through searching a dictionary based on a plurality of white run lengths extracted from said pattern, comprising:
    a tree-structured dictionary comprising a plurality of branch nodes, each having an assigned position and a threshold value for the white run length for that position, and each branching into two additional nodes;
    rejection means for aborting the search when the white run length at an assigned position is outside of a predetermined limit; and
    decision means for assigning at each branch node said unknown character pattern to one of the branches based on a comparison of the white run length at the assigned position of said unknown character pattern with the threshold value.

9. The character recognition apparatus of claim 8 wherein said tree-structured dictionary is characterized in that the two additional nodes connected to each branch node represent a subset of the character category candidates represented by the branch node.

10. The character recognition apparatus of claim 9, additionally comprising means for pattern matching the unknown character pattern with reference patterns for each character within the character subset determined through searching the dictionary.

11. In a method of character recognition, a method of automatically assigning an unknown character pattern to one of a plurality of character classes, comprising:
    extracting from said unknown character pattern a plurality of multivalued features;
    searching a tree-structured dictionary comprising a plurality of branch nodes and a plurality of character category terminal nodes and at least one reject terminal node, wherein each branch node has assigned to it a multivalued feature and a threshold, and each character category terminal node has assigned to it a character class, said searching further comprising, at each of said branch nodes, (a) responding to the existence of assigned limits for the multivalued feature associated with the branch node, and selecting the successor reject terminal node if the multivalued feature is outside of any limit, thereby ending the search, (b) comparing a multivalued feature value extracted from said unknown character pattern and the threshold assigned for that branch node, (c) selecting one of the branches from said branch node based on said comparison, and (d) continuing said comparing and selecting until a terminal node is selected, thereby ending the search.

12. The method of claim 11 wherein said multivalued features include a distance from a predetermined position on a character frame to a position on a character pattern in a predetermined direction.

13. The method of claim 11, additionally comprising pattern matching said unknown character pattern to a reference pattern for each character of the character class of the selected character category terminal node.

14. The method of claim 13, additionally comprising ordering said reference patterns according to the closeness with which they match said unknown character pattern.

* * * * *